(12) United States Patent
Smith et al.

(10) Patent No.: US 7,493,496 B2
(45) Date of Patent: Feb. 17, 2009

(54) BIOMETRIC SYSTEM

(75) Inventors: Martin R. Smith, Dundee (GB);
Michael Coutts, Dundee (GB); Gary A. Ross, Fife (GB)

(73) Assignee: NCR Corporation, Dayton, OH (US)

( * ) Notice: Subject to any disclaimer, the term of this patent is extended or adjusted under 35 U.S.C. 154(b) by 915 days.

(21) Appl. No.: 10/929,237

(22) Filed: Aug. 30, 2004

(65) Prior Publication Data

US 2005/0074147 A1    Apr. 7, 2005

(30) Foreign Application Priority Data

Sep. 23, 2003    (GB) ................................. 0322176.9

(51) Int. Cl.
*G06F 9/24* (2006.01)
(52) U.S. Cl. .................... 713/186; 713/182; 713/189
(58) Field of Classification Search ................. 713/186, 713/182, 189
See application file for complete search history.

(56) References Cited

U.S. PATENT DOCUMENTS 6,483,930 B1    11/2002   Musgrave et al.

FOREIGN PATENT DOCUMENTS

| EP | 0 999 518 A1 | 5/2000 |
|----|--------------|--------|
| EP | 1 139 301 A2 | 10/2001 |
| EP | 1 302 907 A1 | 4/2003 |
| EP | 1 335 329 A2 | 8/2003 |
| EP | 1 139 301 A3 | 5/2004 |
| GB | 2331613 A | 5/1999 |
| JP | 100137223 A | 11/1996 |
| WO | WO 03/002013 A1 | 1/2003 |

*Primary Examiner*—Thomas R Peeso
(74) *Attorney, Agent, or Firm*—Michael Chan

(57) ABSTRACT

A biometric system (10) for assisting a user in providing a biometric reading is described. The system (10) comprises: a biometric capture unit (12) for capturing biometric data from a user; and feedback means (30) for providing the user with an indication of the extent to which a measurement has been captured. The feedback means (30) may be implemented by a display, a loudspeaker (508), or both. The system may also include anonymizing means (66) for providing the feedback means (30) with an anonymized version of the data measured from the biometric capture unit (12).

5 Claims, 5 Drawing Sheets

BIOMETRIC SYSTEM

BACKGROUND OF THE INVENTION

The present invention relates to a biometric system, and particularly to a biometric system for improving capture of a human characteristic by a biometric sensor. The invention also relates to a self-service terminal incorporating such a biometric system.

Biometrics is the measurement of some physical or biological trait or characteristic pertaining to an individual for use in confirming or determining the individual's identity.

Biometric systems are typically used in applications where secure access is required. Secure access may relate to physical locations (such as parts of a building), electronic devices and systems (such as automated teller machines, cellular telephones, personal computers), and software applications.

Secure access may be provided by a user typing in data, such as login codes or passwords. However, these can be compromised relatively easily if a third party becomes aware of the data to be typed in. Secure access may also be provided by identification card and personal identification number (PIN) combinations, such as is commonly required at automated teller machines (ATMs). However, this can also be compromised if the card details and the PIN are obtained by a third party.

Biometric systems have the advantage that a trait of an individual is measured to determine if that individual should be allowed access to a secure area or device. This makes it much more difficult for a third party to gain access because no data entry occurs. However, biometric systems have the disadvantage that it is relative difficult to obtain an accurate reading from an individual, particularly if the individual is a member of the public who has not been trained in how to use the biometric system, and if the system is used in an unattended environment.

One example of an application where biometric systems are used with members of the public is ATMs. An ATM is a particular type of self-service terminal (SST). SSTs are generally public-access devices that are designed to allow a user to conduct a transaction or to access information in an unassisted manner and/or in an unattended environment. SSTs typically include some form of tamper resistance so that they are inherently resilient. SSTs allow users to obtain information or to conduct a transaction, and include: ATMs; non-cash kiosks that allow users to access information (for example, to view reward points on a reward card the user inserts into the SST); and kiosks that accept payment for services (for example, Web surfing kiosks, kiosks that allow users to buy goods, and such like). The term SST has a relatively broad meaning and includes vending machines.

When a member of the public uses a biometric system on an ATM, it is common for the individual to present his or her characteristic to be sensed in a non-optimal manner. For example, if the biometric system includes a fingerprint sensor, the individual may not put all of his or her finger on the sensor; if the biometric system includes an iris imaging device, then the individual may not look directly at the imaging device. This may result in either the biometric capture process having to be repeated, or the individual being denied access.

SUMMARY OF THE INVENTION

It is among the objects of an embodiment of the present invention to obviate or mitigate one or more of the above disadvantages or other disadvantages associated with prior art biometric systems.

According to a first aspect of the present invention there is provided a biometric system comprising: a biometric capture unit for capturing biometric data from a user; and feedback means for providing the user with an indication of the extent to which a measurement has been captured.

The feedback means may comprise a display for providing a visual indication of how a portion of the user's body being measured is aligned relative to the capture unit. Alternatively, or additionally, the feedback means may comprise a loudspeaker or headphones for providing an audible indication of how a portion of the user's body being measured is aligned relative to the capture unit.

In some embodiments the feedback means may comprise a dislocated interface, so that a user's portable device, such as a cellular telephone or portable digital assistant, presents visual or audible information to a user.

Preferably, the visual indication is an anonymized representation of the characteristic being measured so that it is not possible to determine the user's characteristic from viewing the visual indication. This has the advantage of avoiding user perception that his/her personal information is being displayed publicly, thereby reducing any concerns the user may have about lack of security.

The anonymized representation may be a standard image used for every individual or an image of the individual's actual characteristic but with some information removed or distorted.

The image may be a single color, or varying shades or colors.

This aspect of the present invention has the advantage that a user is automatically assisted in providing an accurate biometric reading.

A further advantage is that live feedback is provided in a self-service environment to assist in obtaining a high quality biometric reading.

Another advantage is that this live feedback is anonymized so that it does not compromise security of the biometric.

According to a second aspect of the present invention there is provided a self-service terminal incorporating a biometric system comprising: a biometric capture unit for capturing biometric data from a user; and feedback means for providing the user with an indication of the extent to which a measurement has been captured.

The terminal may further comprise anonymizing means for providing the feedback means with an anonymized version of the data measured from the biometric capture unit.

The SST may be an ATM, an information kiosk, or such like.

According to a third aspect of the present invention there is provided a method of assisting a user in providing a biometric reading, the method comprising: capturing biometric data from a user; and providing the user with an indication of the extent to which a measurement has been captured.

The method may comprise the further step of: indicating to the user how a portion of the user's body being measured is aligned relative to an ideal position for measuring that portion of the body.

The method may comprise the further step of: providing an anonymized version of the data measured from the biometric capture unit.

The method may be implemented in a self-service terminal.

According to a fourth aspect of the present invention there is provided a biometric system comprising: a biometric capture unit for capturing biometric data from a user; and feedback means for providing the user with an indication of a current position of the user relative to a position for capturing a complete measurement.

The indication may provide a representation of the characteristic being measured in a current position superimposed on a correctly aligned position, thereby indicating to the user how the user should move to ensure that a better measurement is obtained. In one embodiment, this may be achieved by providing a dot indicating where the centre of the user's finger is currently located, and a cross-hair indicating where the centre of the user's finger should be located.

According to a fifth aspect of the present invention there is provided a method of assisting a user in providing a biometric reading comprising: capturing biometric data from a user; and providing the user with an indication of a current position of the user relative to a position for capturing a complete measurement.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
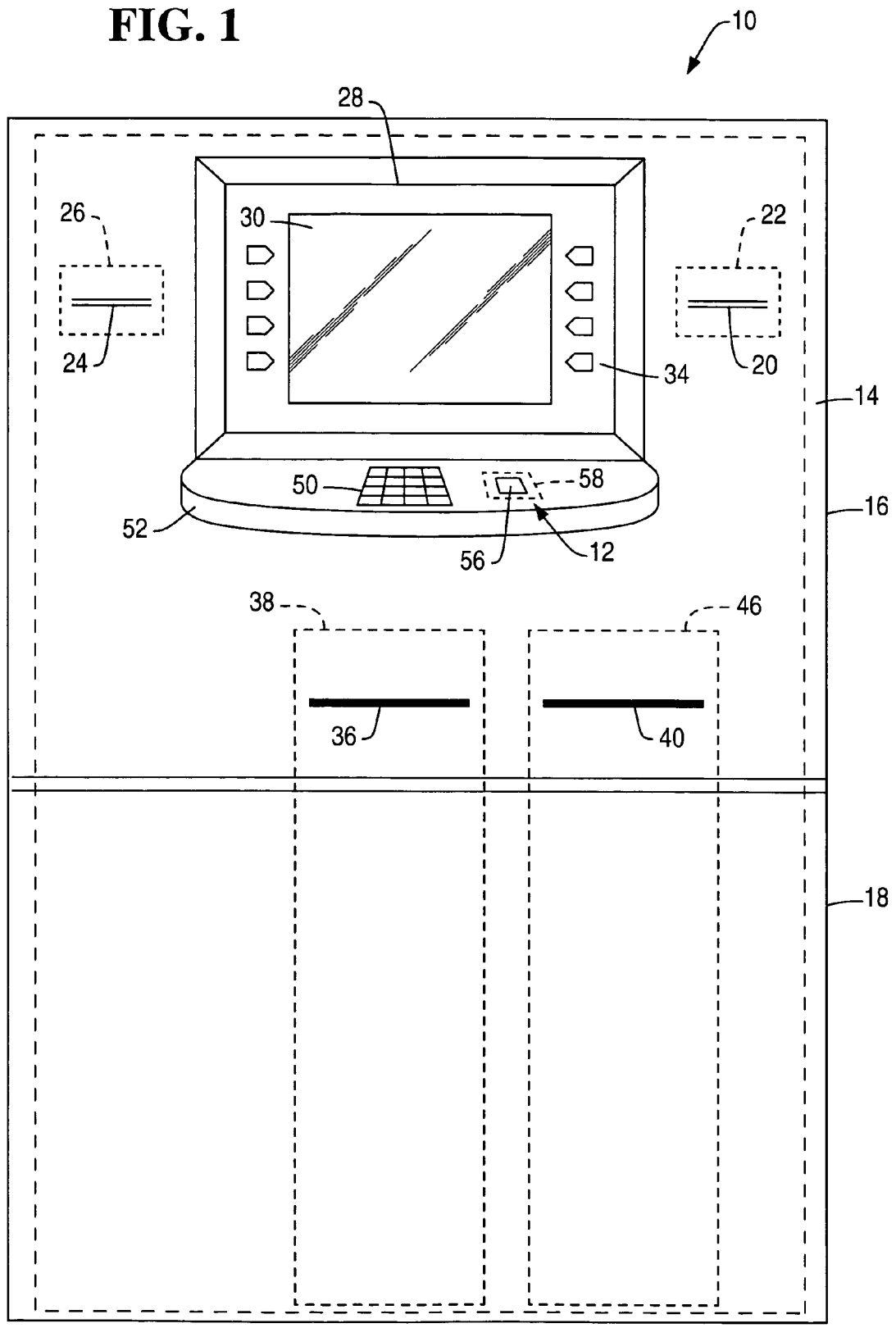
FIG. 1 is a simplified schematic front view of a self-service terminal incorporating a biometric system according to a first embodiment of the present invention.
Figure 2:
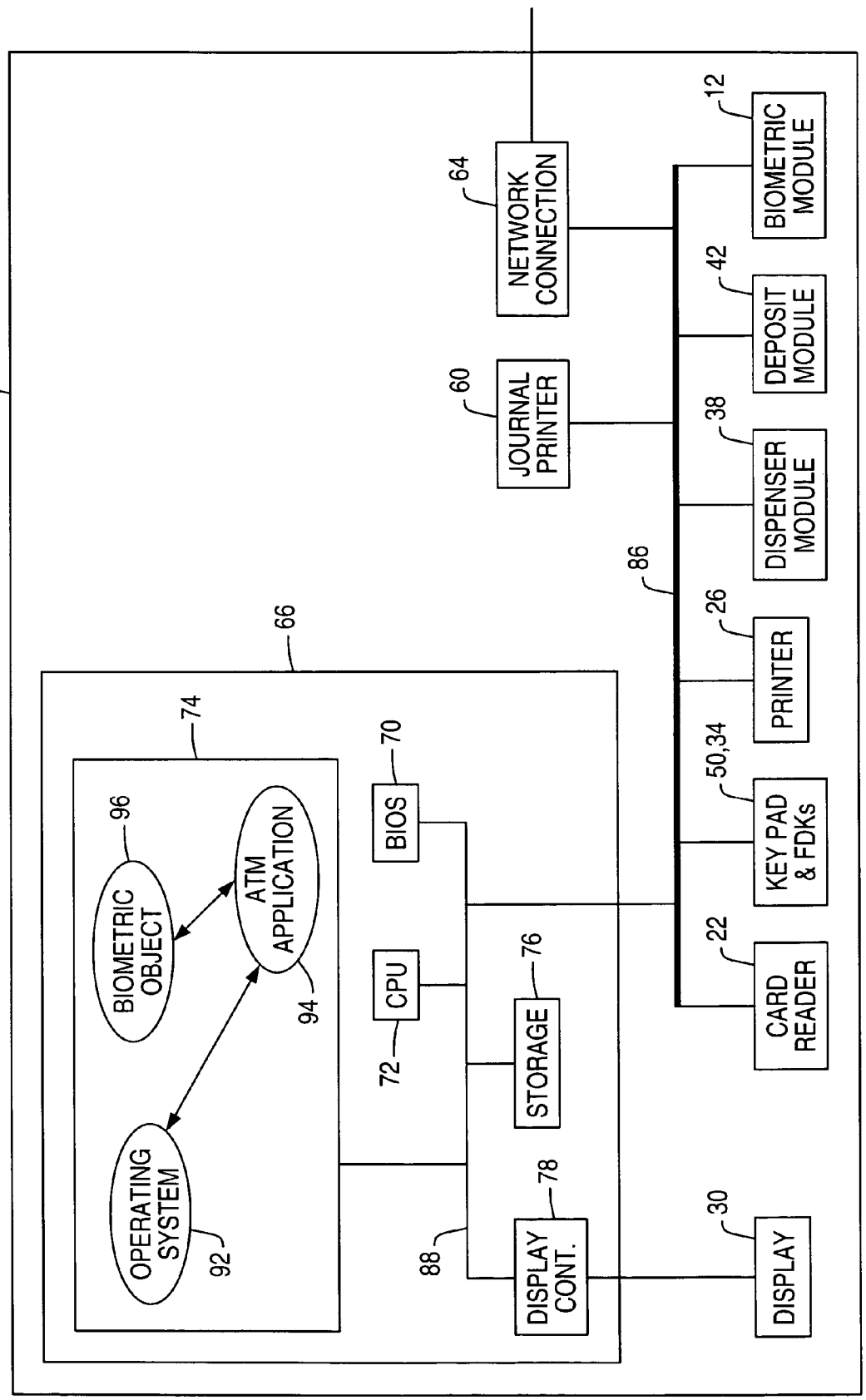
FIG. 2 is a block diagram showing internal modules in the terminal of FIG. 1.

Reference is now made to FIGS. 1 and 2, which show a self-service terminal 10 in the form of an automated teller machine (ATM) including a biometric module 12 according to one embodiment of the invention. The ATM 10 has a chassis 14 to which is pivotably coupled a plastic fascia 16 covering an upper portion of the chassis 14. A door 18 is hingably coupled to a lower portion of the chassis 14. When the fascia 16 is hinged open and the door 18 is swung open, an operator can gain access to modules located within the ATM 10.

The fascia 16 provides a user interface to allow a user to interact with the ATM 10. In particular, the fascia 16 has apertures aligning with modules mounted in the chassis 14 when the fascia 16 is pivoted to the closed position. The fascia 16 defines: a card reader slot 20 aligning with a card reader module 22 mounted within the chassis 14; a receipt printer slot 24 aligning with a receipt printer module 26 mounted within the chassis 14; a display aperture 28 aligning with a combined display 30 and associated function display keys (FDKs) 34 mounted as a module within the chassis 14; a dispenser slot 36 aligning with a dispenser module 38 mounted within the chassis 14; and a deposit aperture 40 aligning with a deposit module 42 mounted within the chassis 14.

The fascia 16 also includes an encrypting keypad 50 mounted on a shelf portion 52 extending outwardly from beneath the display aperture 28. The encrypting keypad 50 also receives input from the FDKs 34.

The biometric module 12 is mounted in the shelf portion 52 and includes (i) a sensor 56 for receiving a human finger and for capturing fingerprint details, and (ii.) an interface 58 for encrypting and relaying a captured fingerprint image. The sensor 56 protrudes through an aperture in the shelf portion 52, and the interface 58 is mounted behind the shelf portion 52.

The biometric sensor 56 is a Fingerloc (trade mark) AF-S2 fingerprint sensor, available from Authentec, Inc., P.O. Box 2719, Melbourne, Fla. 32902-2719, U.S.A.

The sensor 56 comprises an array of pixels arranged in rows and columns. A fingerprint image is scanned by digitizing outputs from each row in a programmed sequence. The outputs can be analyzed to determine the centre of the user's finger, for example, in terms of an x and y co-ordinate.

Internally, the ATM 10 also includes a journal printer module 60 for creating a record of every transaction executed by the ATM 10, a network connection module 64 for accessing a remote authorization system (not shown), and a controller module 66 (in the form of a PC core) for controlling the operation of the ATM 10, including the operation of the modules.

The controller 66 comprises a BIOS 70 stored in non-volatile memory, a microprocessor 72, associated main memory 74, storage space 76 in the form of a magnetic disk drive, and a display controller 78 in the form of a graphics card.

The display module 30 is connected to the controller module 66 via the graphics card 78 installed in the controller module 66. The other ATM modules (12, 22, 26, 34, 38, 42, and 50) are connected to the ATM controller 66 via a device bus 86 and one or more internal controller buses 88.

In use, the main memory 74 is loaded with an ATM operating system kernel 92, an ATM application 94, and a biometric capture object 96. As is well known in the art, the operating system kernel 92 is responsible for memory, process, task, and disk management. The ATM application 94 is responsible for controlling the operation of the ATM 10. In particular, the ATM application 94 provides the sequence of screens used in each transaction (referred to as the transaction flow); monitors the condition of each module within the ATM (state of health monitoring); and obtains authorization for transactions from a remote transaction authorization server (not shown).

The term "screen" is used herein to denote the graphics, text, controls (such as menu options), and such like, that are presented on an SST display; the term "screen" as used herein does not refer to the hardware (that is, the display) that presents the graphics, text, controls, and such like. Typically, when a transaction is being entered at an SST, a series of screens are presented in succession on the SST display, the next screen displayed being dependent on a user entry or activity relating to the current screen. For example, a first screen may request a user to insert a card; once a card has been inserted a second screen may invite the user to enter his/her PIN; once the final digit of the PIN has been entered, a third screen may invite the user to select a transaction; and so on.

The biometric capture object 96 receives data from the sensor 56, processes this received data, and forwards the processed data to the ATM application 94 for use in authenticating a user, as will be described in more detail below.

The controller 66 (particularly the biometric capture object 96) and the biometric module 12 together comprise a biometric system. The display 30 provides a feedback means for this biometric system.

Prior to conducting a transaction, a user enrolls by providing a sample of his fingerprint. This enrolment typically occurs at a bank branch or other secure facility so that additional forms of identification (for example, a driver's license, a passport, or such like) may be provided to ensure that the person submitting the fingerprint is who they claim to be.

To provide a sample, the user places his finger on a fingerprint sensor similar to sensor 56 shown in FIG. 1. The user's fingerprint is sensed and a template is generated based on the user's fingerprint, as is known to those of skill in the art. The template is a data file that is produced by applying a conventional mathematical operation to measurements taken from the captured fingerprint. Each user has a unique template.

When a user subsequently presents himself at the ATM 10 and places his finger on the sensor 56, the sensor 56 captures the fingerprint and the biometric capture object 96 operates on the newly-captured fingerprint to produce a test data file.

The test data file is then used in one of two ways, depending on whether the biometric system operates in recognition mode or in verification mode.

In verification mode, the user claims an identity, for example by inserting an identification card. The template for that user is retrieved by the biometric capture object 96 and compared with the test data file to determine if the user's identity is verified.

In identification mode, no user identification is presented except the biometric characteristic. The test data file is compared with all stored templates to determine if the test data file matches any of the stored templates.

Figure 3:
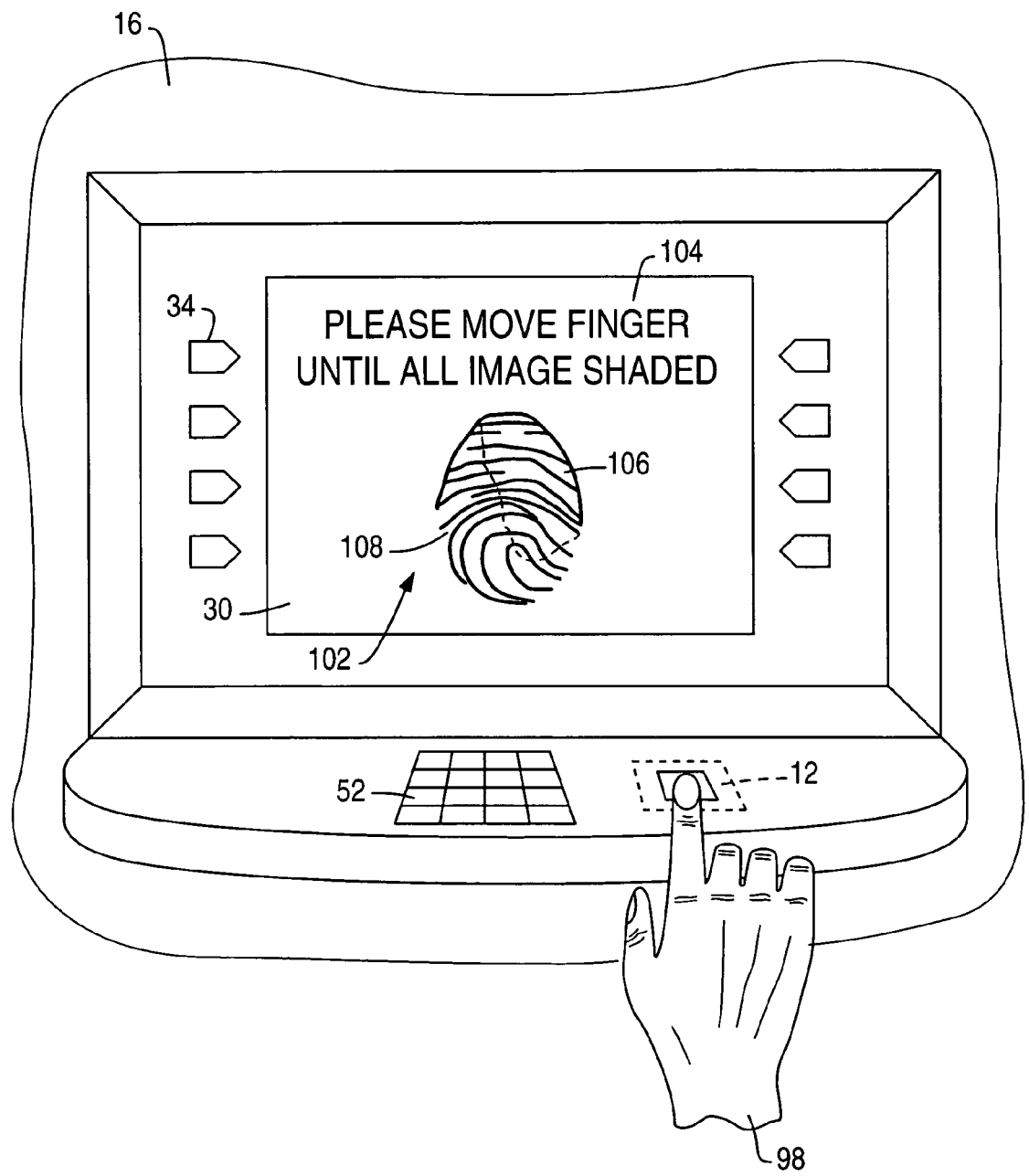
FIG. 3 is a pictorial view of a part of the terminal of FIG. 1 (a display) illustrating a visual indication for assisting a user in providing a high quality biometric reading.
Figure 4:
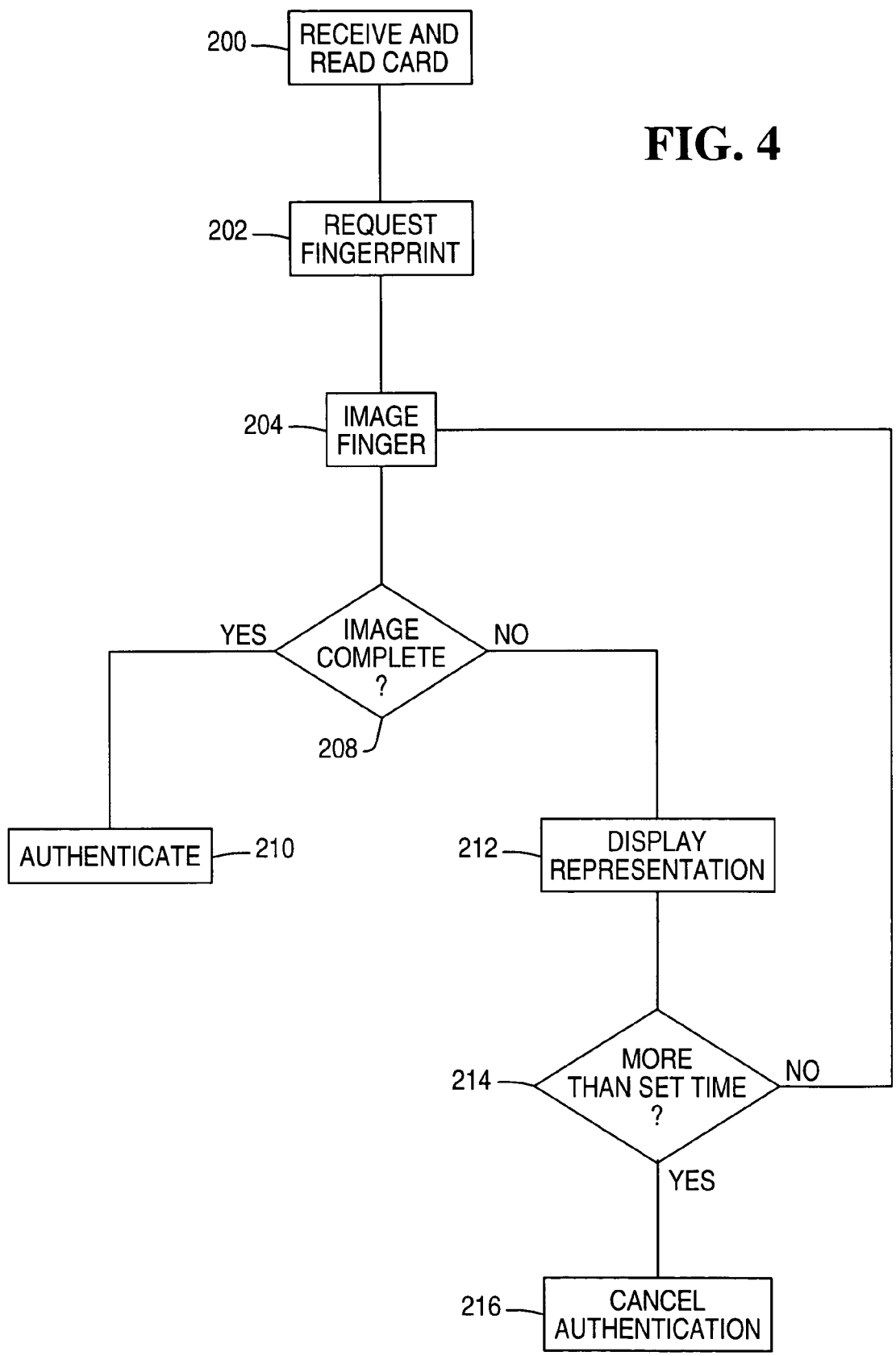
FIG. 4 is a flowchart illustrating the steps involved in authenticating a user of the terminal of FIG. 1.

An example of user identification at the ATM 10 will now be described, with reference to FIGS. 3 and 4. FIG. 3 illustrates a portion of the ATM 10 including the display 30, a portion of the fascia 16 surrounding the display 30, the keypad 52, and the biometric module 12. FIG. 4 is a flowchart illustrating steps performed by the ATM 10 to authenticate a user 98.

In this example, an identification card is used. The user inserts the identification card into the card reader module 22 of the ATM 10. The card reader module 22 receives this card, reads identification information encoded therein, and forwards this information to the controller 66. The controller 66 uses the read information to access a unique user reference and a template corresponding to this unique user reference (step 200). The template may be stored locally at the ATM 10 or at a remote host (not shown).

The ATM 10 then requests, via a screen on display 30, the user to place a finger on the fingerprint sensor 56 (step 202).

The ATM 10 then captures an image of the finger using the biometric module 12 (step 204).

The biometric capture object 96 executing in the ATM's memory 74 receives the captured image and determines if a complete image of the user's fingerprint has been recorded (step 208).

If a complete image has been recorded, then authentication proceeds as for a conventional ATM 10 implementing a biometrics authentication system (step 210). This involves operating on the captured image to generate a test data file and comparing the test data file with the template for that user to determine if there is a match. If there is a match then the user's identity is validated, if there is not a match then the user's identity is not validated.

Returning to step 208, if a complete image has not been recorded, then the ATM 10 presents a finger adjustment screen 102 (FIG. 3) to the user (step 212). The finger adjustment screen 102 includes text 104, a visual representation of the image that was recorded 106, and a visual representation of a complete image 108.

The visual representation 106 of the image that was recorded is anonymized by the biometric capture object 96 so that the actual features of the user's fingerprint are not displayed. In this embodiment, a standard image of a fingerprint is used as the visual representation of a complete image 108, and that portion of the user's fingerprint that was captured is represented by shading a corresponding portion of the standard image 108 to provide a shaded portion 106.

The standard image 108 is not the user's fingerprint but is an image resembling a fingerprint and stored by the biometric capture object 96. The same standard image 108 is displayed to every user.

The shaded portion 106 is a visual indication of the extent to which a measurement has been captured, and it enables the user 98 to determine how he should move his finger to ensure that a more complete image is captured. In the example shown in FIG. 3, the user 98 must rotate his fingertip to the left and apply more pressure to the base of the fingertip to ensure that a complete image is recorded.

The ATM 10 determines how much time has elapsed since a reading was first taken (step 214). If this time period exceeds a predetermined limit, for example 45 seconds, then the ATM 10 cancels the authentication procedure (step 216) and returns the card to the user 98. The ATM 10 may display a screen informing the user 98 of how to obtain training in using the biometric sensor 56.

If the time period does not exceed the predetermined time limit, then the ATM 10 reverts to step 204, where the user's finger is imaged.

It will now be appreciated that the above embodiment has the advantage that a user is presented with an indication of the portion of finger contact currently provided relative to what is required for an accurate reading.

Figure 5:
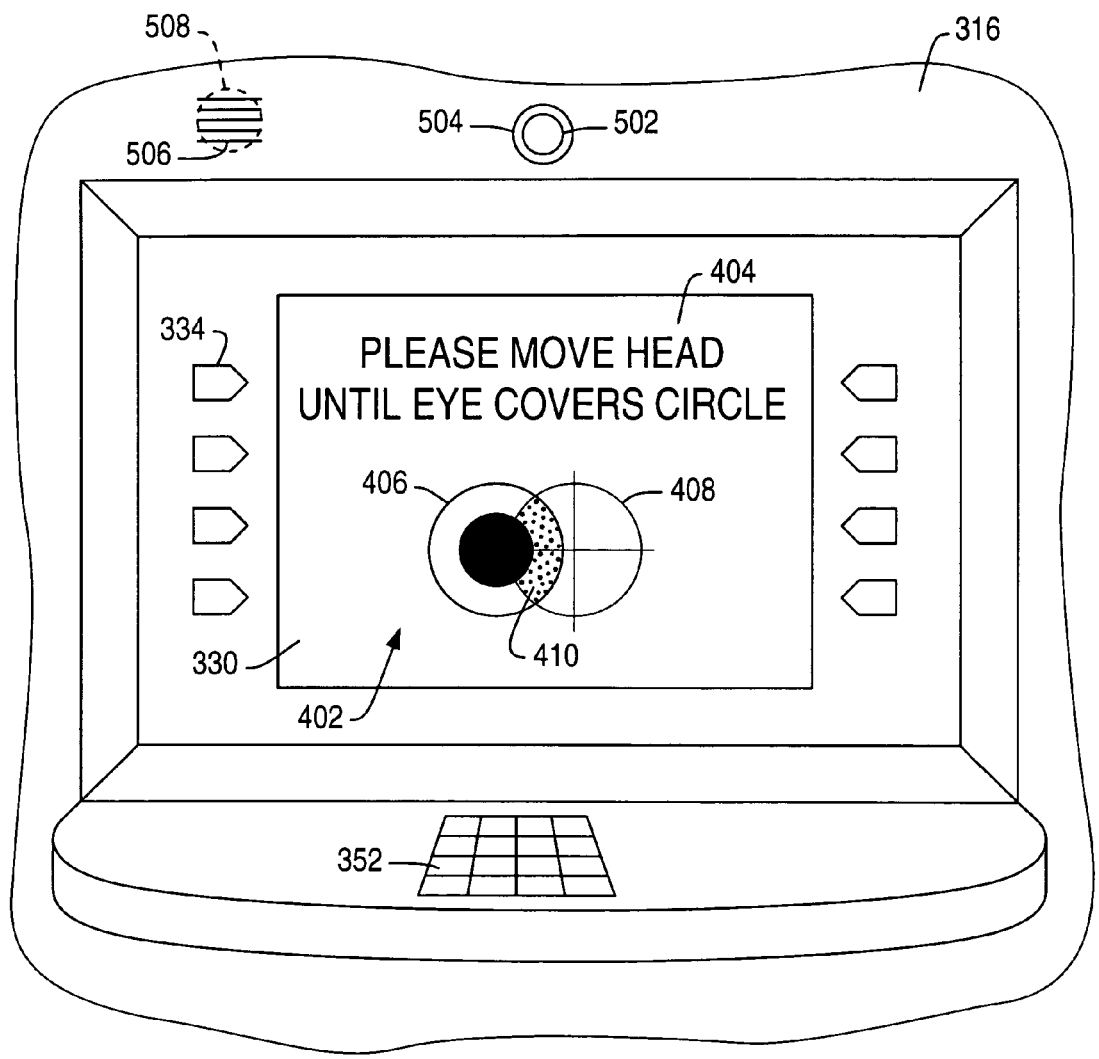
FIG. 5 is a pictorial view of a part of a self-service terminal (a display) illustrating an alternative visual indication for use with an alternative biometric system.

Reference will now be made to FIG. 5, which shows part of an alternative self-service terminal implementing a human iris biometric system.

FIG. 5 shows a fascia portion 316, a display 330, FDKs 334, and an encrypting keypad 352. The fascia portion 316 defines an aperture 502 through which a human iris camera 504 protrudes, and a slatted portion 506 behind which a loudspeaker 508 is mounted. The camera 502 captures images of a user's iris to verify the identity of the user. Biometric systems implementing iris recognition are well known, see for example U.S. Pat. No. 5,291,560 to Daugman. A suitable iris camera is available from Iridian Technologies, Inc. 121 Whittendale Drive, Suite B, Moorestown, N.J. 08057.

In a similar way to ATM 10, this terminal provides an eye adjustment screen 402 including text 404, a visual representation 405 of an iris (not the actual iris image that was captured), a visual representation 408 of a complete image, in the form of a circle corresponding in size to the representation of the iris image 405.

The visual representation 405 includes a shaded portion 406 indicating the extent to which a complete image has been captured.

The text 404 instructs the user to move until the representation of the iris 405 aligns with the circle 408. Furthermore, the terminal causes the loudspeaker 508 to emit audible instructions directing the user to move until the iris 405 aligns with the circle 408. When the iris and circle are aligned, a complete image is captured and can be used to authenticate the user.

It will now be appreciated that the above embodiments have the advantage that non-personal representations of a captured biometric image is presented to a user to facilitate use of the system in a self-service environment.

Various modifications may be made to the above-described embodiments within the scope of the present invention, for example, the biometric system may be a facial geometry system, a hand geometry system, or any other convenient biometric system.

The particular visual representation selected to present to a user may vary from those described above. For example, different colors may be used. It will be apparent that when other biometric systems are used, the visual representation will represent the type of biometric that is captured.

In other embodiments, the terminal may be a non-cash kiosk, a vending machine, or such like.

In other embodiments, a different preset time period may be used, which may be longer or shorter than 45 seconds.

In other embodiments, no preset time limit may be used.

In other embodiments, the biometric capture object 96 may remove features from a captured image and use that anonymized image to indicate the extent to which an accurate measurement has been recorded.

The method also has applications outside the self-service environment, as will be evident to one of skill in the art.

What is claimed is:

1. A biometric system comprising:
    a biometric capture unit for capturing biometric data from a user;
    feedback means for providing the user with an indication of the extent to which a measurement has been captured;
    wherein the feedback means includes a display for providing a visual indication of how a portion of the user's body being measured is aligned relative to the capture unit;
    wherein the visual indication provides a representation of a characteristic being measured in a current position superimposed on a correctly aligned position, thereby indicating to the user how the user should move to ensure that a better measurement is obtained; and
    means for anonymizing the characteristic being measured so that the user's characteristic is unable to be determined from viewing the visual indication.

2. A system according to claim 1, wherein the anonymizing means selects a standard image used for every individual.

3. A system according to claim 1, wherein the anonymizing means selects an image of the individual's actual characteristic but with some information removed or distorted.

4. A self-service terminal for allowing a user to conduct a self-service transaction, the terminal comprising:
    a biometric capture unit for capturing biometric data from a user to verify identity of the user before allowing the user to gain access to the terminal to conduct a self-service transaction;
    feedback means for providing the user with an indication of the extent to which a measurement has been captured; and
    anonymizing means for providing the feedback means with an anonymized version of the data measured from the biometric capture unit.

5. A method of assisting a user in providing a biometric reading, the method comprising:
    capturing biometric data from a user;
    providing the user with an indication of the extent to which a measurement has been captured; and
    providing an anonymized version of the captured biometric data.

* * * * *